United States Patent [19]

Gallagher

[11] 3,929,933

[45] Dec. 30, 1975

[54] RIGID PLASTIC ADMIXED WITH CROSSLINKED ACRYLATE/VINYL CHLORIDE INTERPOLYMER

[75] Inventor: Ruth E. Gallagher, Dobbs Ferry, N.Y.

[73] Assignee: Stauffer Chemical Company, Westport, Conn.

[22] Filed: Dec. 12, 1973

[21] Appl. No.: 424,128

Related U.S. Application Data

[63] Continuation-in-part of Ser. No. 182,127, Sept. 20, 1971, abandoned, which is a continuation-in-part of Ser. No. 101,160, Dec. 23, 1970, abandoned.

[52] U.S. Cl. ......... 260/876 R; 260/879; 260/880 R; 260/881; 260/884; 260/885; 260/886
[51] Int. Cl.² ................... C08L 51/00; C08L 53/00
[58] Field of Search ............ 260/876 R, 880 R, 884, 260/885

[56] References Cited

UNITED STATES PATENTS

| | | | |
|---|---|---|---|
| 3,334,156 | 8/1967 | Calentine et al. | 260/884 |
| 3,370,105 | 2/1968 | De Bell et al. | 260/880 R |
| 3,657,172 | 4/1972 | Gallagher et al. | 260/876 R |
| 3,657,382 | 4/1972 | Kopacki | 260/876 R |
| 3,660,529 | 5/1972 | Groch | 260/876 R |
| 3,821,329 | 6/1974 | Gallagher | 260/885 |

*Primary Examiner*—Richard B. Turer

[57] ABSTRACT

Certain rigid plastics are reinforced by admixture with a plurality of rubber-containing interpolymer particles which are prepared by the suspension polymerization of vinyl chloride in the presence of an aqueous emulsion of particles comprising a crosslinked acrylic rubber having a Tg of less than about 25°C. The resulting reinforced plastics display excellent physical properties.

14 Claims, No Drawings

RIGID PLASTIC ADMIXED WITH CROSSLINKED ACRYLATE/VINYL CHLORIDE INTERPOLYMER

RELATED APPLICATIONS

This application is a continuation-in-part of application Ser. No. 182,127, filed Sept. 20, 1971, and now Abandoned, which in turn in a continuation-in-part of application Ser. No. 101,160, filed Dec. 23, 1970 and now abandoned.

BACKGROUND OF THE INVENTION

It is a common practice to reinforce such rigid plastics as polyvinyl chloride, polymethyl methacrylate, polystyrene, styrene-acrylonitrile copolymers and the like with particles of rubber polymers such as polybutadiene and the polyacrylates. The addition of rubber to these common plastics improves their impact strength, that is their ability to withstand a rapidly applied shock. While the addition of rubber improves the impact strength of these particles, their other physical properties such as tensile strength, clarity, heat distortion temperature, hardness and aging stability are, however, adversely affected by the rubber.

A procedure which is often used to reinforce such hard brittle polymers involves their preparation in the presence of rubbers. The products resulting from such polymerization procedures which are referred to as interpolymers or graft copolymers, normally have rubber contents of about 20–60%. These high rubber content materials are employed as so-called "impact modifiers" by being blended with brittle plastics in order to enhance their impact strength. The rubber content of these blends is generally about 5–25%. For example, styreneacrylonitrile, i.e., "SAN", monomers are commonly polymerized in the presence of polybutadiene rubbers at about a 50/50 SAN to rubber ratio. The resulting graft copolymer is then blended with a conventional styrene-acrylonitrile copolymer to a rubber content of about 10–20% so as to produce ABS type plastics.

TECHNICAL DISCLOSURE OF THE INVENTION

In brief, the novel process of this invention comprises a means for reinforcing certain rigid ABS, SAN, MBS and ASA plastics with a novel modifier, all of which will be more fully described hereinbelow.

In brief, this novel modifier is prepared by means of a process which comprises the suspension polymerization of vinyl chloride, or a mixture of vinyl chloride with a minor proportion of one or more comonomers, in the presence of an aqueous emulsion of crosslinked, acrylic rubber particles. The latter process yields particles of what may be termed as "suspension-emulsion interpolymer" (SEI) particles in which microscopic examination reveals that the polymer of the suspension polymerized vinyl monomer, i.e., the polyvinyl chloride, surrounds and/or is intimately dispersed throughout the mass of the rubber particles. This phenomenon apparently results from the fact that the vinyl chloride monomer which is used for the final suspension polymerization step, has partially swollen the rubber particles prior to polymerizing. The resulting particles, having been prepared by means of a suspension process, are in the form of agglomerates which have a particle size that is substantially greater than that of the original rubber emulsion particles utilized in their preparation. As a result, these SEI particles are far easier to dry and to handle than are these rubber emulsion polymer particles. Moreover, they provide superior results as high impact plastics and as modifiers for the reinforcement of a large variety of rigid plastics wherein they impart excellent impact strength without substantially detracting from any other physical properties. Thus, as used in this disclosure, the term "interpolymer" denotes a product resulting from the polymerization of one or more monomers in the presence of a previously prepared homo- or copolymer. Moreover, the term "rigid polymer" or "rigid plastic", as defined by ASTM D-883, denotes a polymer or plastic that has a modulus of elasticity, either in flexure or in tension, greater than 7,000 Kgf/Cm$^2$ (100,000 psi) at 23°C. and 50% relative humidity when tested in accordance with ASTM D-747, D-790, D-638 or D-882.

Because of the high rubber content in the novel modifiers of this invention which is in the range of from about 2–80%, by weight, only small quantities of these impact modifiers are required in order to improve the impact strength of a brittle plastic. For example, when being blended with SAN polymers, their use in a concentration as low as about 5 phr can be effective.

The interpolymer product of this invention exhibits improved heat stability, weatherability, and oxidative stability over impact modifiers which are based on polybutadiene type rubbers, e.g., ABS and MBS type additives. This improvement results from the fact that the polybutadiene rubbers contain residual unsaturation which is susceptible to oxidation so that the impact modifiers based upon such rubbers must almost always be stabilized with from about 0.2–3% of an expensive antioxidant. By contrast, the modifiers of this invention contain an acrylic type rubber which resists oxidative degradation and therefore requires the addition of little, if any, additional antioxidants. Thus, the SEI product of this invention is particularly suitable for outdoor uses since it undergoes little, if any, discoloration during either processing or aging whereas many ABS and MBS type products lose their effectiveness on aging.

The novel interpolymer product of this invention can also impart flame retardance as well as impact strength when used as a modifier for such flammable thermoplastics as styrene-acrylonitrile copolymers. This is a particularly advantageous property if the resulting polymer blends are to be used in the building construction, automotive, home furnishing or aerospace industries. The flame retardancy imparted by these novel impact modifiers is thought to result from their high chlorine content, which is in the range of from about 25–45%, by weight.

It should also be noted that the suspension-emulsion interpolymerization process which is used to prepare the impact modifiers of this invention has distinct advantages over the methods heretofore used to prepare other impact modifiers. Thus, most impact modifiers are prepared by means of graft emulsion polymerization procedures in which the resulting graft copolymer emulsions must then be coagulated with brine or spray dried. On the other hand, in the process of this invention, the vinyl chloride is suspension polymerized yielding a granular product which is readily filtered free of water and then air dried. The need for a separate isolation step for the polymer is thereby eliminated. In addition, the product is substantially free of ionic impurities and emulsifiers which tend to impair its heat stability.

Applicable vinyl chloride polymers for preparation of the SEI particles include homopolymers and copolymers of vinyl chloride together with a minor proportion of one or more of such vinyl monomers as the alpha-olefins such as ethylene, propylene and butylene; vinyl esters of carboxylic acids such as vinyl acetate, vinyl benzoate, vinyl butyrate, and vinyl stearate; vinylidene halides such as vinylidene chloride; the $C_1$-$C_{20}$ alkyl esters of acrylic and methacrylic acid such as methyl methacrylate, methyl acrylate, ethyl acrylate, butyl acrylate, 2-ethylhexyl acrylate and lauryl acrylate; aryl, halo- and nitro- substituted benzyl esters of acrylic and methacrylic acid such as benzyl acrylate and 2-chlorobenzyl acrylate; ethylenically unsaturated monocarboxylic acids such as acrylic and methacrylic acids; ethylenically unsaturated dicarboxylic acids, their anhydrides and their $C_1$-$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide; vinyl aryl compounds such as styrene and alphamethyl styrene; nitriles of ethylenically unsaturated carboxylic acids such as acrylonitrile and methacrylonitrile; vinyl pyrrolidones such as N-vinyl-2-pyrrolidone; $C_1$-$C_{20}$ alkyl vinyl ethers such as methyl vinyl ether, ethyl vinyl ether and stearyl vinyl ether; dienes such as isoprene and butadiene; and, any other vinyl monomers copolymerizable with vinyl chloride. From this group, the use of vinyl esters such as vinyl acetate is preferred. The resulting products are found to have improved physical properties as evidenced by their superior impact strength which is achieved without any substantial reduction in their tensile strength.

In greater detail, now, the rubber particles which are utilized in preparing the novel SEI particles of this invention are made by means of conventional aqueous emulsion procedures well known to those skilled in the art using emulsifiers and water soluble catalysts.

Thus, in conducting the aqueous emulsion polymerization step leading to the preparation of these rubber particles, there is first prepared a monomer charge comprising an aqueous emulsion containing about 10–50%, by weight, of one or more monomers the identity of which will be described in detail hereinbelow. From about 0.05–2.0%, by weight, of the monomer mixture of a water soluble catalyst such, for example, as ammonium, sodium or potassium persulfate, hydrogen peroxide or a redox system such as a mixture of a persulfate with an alkali metal bisulfite, thiosulfate or hydrosulfite is introduced and the mixture is then heated at a temperature of from about 40° to 95°C. for a period of about 0.5 to 8 hours. The emulsion should also contain from about 0.2 to 2.0%, by weight of the total monomer charge, of one or more suitable emulsifiers as described hereinbelow.

Thus, it has been found that optimum results are obtained by the use of emulsifiers which are at the extreme ends of the "HLB" Classification scale as described, for example, in the article entitled, "EMULSIONS" by W. C. Griffin which appears in the Encyclopedia of Chemical Technology, Vol. 8, Second Edition, pages 117–134, (1963). Thus, the "HLB" scale, of from 0 to 50, can be defined as an expression of the relative simultaneous attraction of an emulsifier for water and for oil. It would appear to be determined by the chemical composition and the extent of ionization of a given emulsifier. For example, propylene glycol monostearate has a low HLB value, i.e., it is strongly lipophilic while a polyoxyethylene monostearate having a long polyoxyethylene chain has a medium HLB value, i.e., it is moderately hydrophilic. And, at the other end of the "HLB" scale, for example, is sodium stearate which has a very high HLB value, i.e., it is hydrophilic, since it ionizes and this provides an even stronger hydrophilic group.

It has been found that the use of those surfactants which are at the extreme ends of the HLB scale has the unique effect of resulting in the formation of large latex particles in the range of from about 0.1 to 0.8 microns which are highly desirable for use in carrying out the process of this invention. Typical of this group of surfactants are the sulfosuccinates, specifically the $C_{13}$ bis(tridecyl) ester of sodium sulfosuccinic acid which exhibits an HLB value of about 4–7. This surfactant yields the desired large particle size latices in a "one shot" polymerization process, i.e., a process which does not require incremental addition of the surfactant charge. However, as the chain length of the alkyl ester group in a sulfosuccinate surfactant is reduced to a length of about 6–8 carbon atoms, the HLB value increases to a range of from about 20–40 and the latex particles which are produced will be undesirably small, i.e., in the range of from about 0.06–0.1 microns. Similarly, with respect to the alkyl sulfate surfactants, the $C_{16}$ sodium cetyl sulfate will, for example, yield an undesirable small particle size of from about 0.06–0.1 microns while an alkyl sulfate salt with a short $C_8$ alkyl group, particularly sodium 2-ethylexyl sulfate, has a higher HLB value of about 50 and yields a latex having the desired large particle size of from about 0.1–0.8 microns. Thus, it may be concluded that the applicable surfactants for use in the emulsion polymerization step of the process of this invention should have an HLB value of either about 2–12 or greater than about 40. Moreover, the use of surfactants with HLB values which are not at the extreme ends of the scale also tends to cause plate out during the subsequent suspension polymerization step. This undesirable phenomenon will be discussed in greater detail hereinbelow.

Accordingly, the use of emulsifiers within the above range of HLB values has been found to lead to the preparation of the SEI rubber polymer particles of this invention in a desirably large particle size of from about 0.1–0.8 microns by means of a highly convenient procedure as opposed to the involved techniques described in the prior art for the preparation of products of this type. Thus, for example, in U.S. Pat. No. 3,488,406, it is seen that the polymerization of rubber polymer particles using an emulsifier which is only moderately hydrophobic requires the separate incremental addition to the system of the monomers and of the catalyst over the rather extended period of ten hours. By contrast, the use of emulsifiers having the above-specified HLB values in the process of this invention permits the convenient preparation of the large particle size rubber polymers by means of a procedure in which, in contrast to the teachings of the prior art, all of the surfactant can be added to the system at one time and in which the entire process is completed in from about one to three hours.

Moreover, in a preferred embodiment of the process of this invention, it has been found that regardless of the particular emulsifier being utilized in preparing the rubber polymer latex, its polymerization in large scale commercial equipment is greatly facilitated by introducing the monomer charge to the system in several equal portions over a period of from about 1 to 3 hours.

Thus, where this is not done and the total monomer charge is introduced in one portion, the resulting exothermic polymerization reaction often becomes virtually uncontrollable leading to overheating which, in turn, may set up, i.e., coagulate, the resulting polymer latex. However, by dividing the monomer charge and introducing it in several equal portions, such as, for example, three equal portions, the resulting polymerization reaction remains controllable and overheating and coagulation can be prevented.

The acrylic rubber particles used in preparing the SEI particles of this invention can comprise any crosslinked acrylic polymer or copolymer having a Tg, i.e., a glass transition temperature of less than about 25°C. and which can be polymerized by means of free radical initiated emulsion techniques. These acrylic rubber particles should be crosslinked so that they can retain their size and shape during subsequent polymer processing steps. This crosslinking can be achieved during the polymerization of the acrylic rubber if a polyfunctional ethylenically unsaturated monomer is included in the polymerization recipe. As used in this disclosure, the term "crosslinked" denotes a polymer which at ambient temperatures is substantially insoluble in such organic solvents as tetrahydrofuran or cyclohexane.

Examples of acrylic rubbers that can be used include the polymers of aromatic and $C_2$–$C_8$ alkyl acrylates such as poly(benzyl acrylate) and poly(n-butyl acrylate), poly(ethyl acrylate) and poly(2-ethylhexyl acrylate) and copolymers thereof such as the preferred copolymer of butyl acrylate and 2-ethylhexyl acrylate in a 50–70 to 50–30 weight ratio; which are crosslinked with small quantities of a polyfunctional ethylenically unsaturated monomer, i.e., a monomer containing at least two ethylenically unsaturated groups such, for example, as allyl methacrylate, divinyl benzene, diethylene glycol dimethacrylate, ethylene glycol dimethacrylate, trimethylolpropane trimethacrylate, methylene-bis-acrylamide, diethylene glycol diacrylate, ethylene glycol diacrylate, divinyl ether, diallyl fumarate, diallyl phthalate, divinyl sulfone, divinyl carbitol, triethylene glycol dimethacrylate, trimethylene glycol diacrylate, butylene glycol diacrylate, pentamethylene glycol diacrylate, glyceryl triacrylate, octylene glycol diacrylate, trimethylolpropane triacrylate, the tetraacrylate ester of pentaerythritol and various diallyl phosphonates. Preferred for this purpose, however, is 1,3-butylene diacrylate.

Also useful are copolymers of the aromatic and $C_2$–$C_8$ alkyl acrylates with minor proportions of one or more of such vinyl monomers as styrene; acrylonitrile, vinyl acetate, methyl methacrylate; ethylenically unsaturated carboxylic acids such, for example, as acrylic, methacrylic, itaconic and maleic acids; isoprene; chloroprene; 1,3-butadiene; vinylidene chloride; propylene; ethylene; and, other common vinyl monomers. Optimum results are, however, obtained by the use of a crosslinked copolymer containing from about 90 to 99.8%, by weight, of the n-butyl acrylate/2-ethylhexyl acrylate copolymer crosslinked with about 0.2 to 10%, by weight, of 1,3-butylene diacrylate.

The next step in the process of preparing these SEI particles involves the suspension polymerization of a monomer charge comprising vinyl chloride in the presence of the aqueous emulsion of rubber particles whose preparation has been described hereinabove. In addition to vinyl chloride, one may also use a monomer charge comprising a mixture of vinyl chloride with a minor proportion of one or more additional vinyl monomers other than vinyl chloride including the vinyl esters such as vinyl acetate, vinyl phosphonates such as bis(beta-chloroethyl) vinylphosphonate, vinylidene halides, olefins, alkyl vinyl ethers and the ethylenically unsaturated dicarboxylic acids, their anhydrides and their $C_1$–$C_8$ mono- and dialkyl esters. A more complete listing of these vinyl monomers is included in the preceding description of the preferred embodiment of this invention involving the blending of the SEI particles with polyvinyl chloride. It is, however, preferred to employ vinyl chloride as the sole monomer during this suspension polymerization step.

In conducting the suspension polymerization, the vinyl chloride or the mixture of vinyl chloride with one or more comonomer is added to the previously prepared aqueous emulsion of the rubber polymer particles in a concentration of about 20 to 90%, by weight, of the latter rubber particles. Also required to be admixed with the aqueous emulsion of the rubber polymer particles is a concentration of from about 0.05 to 1.0%, as based on the total weight of the vinyl chloride monomer or monomer mixture which has been added to the aqueous emulsion of the rubber polymer particles, of a suspending agent such, for example, as methyl cellulose, hydroxyethyl cellulose, hydroxypropyl cellulose, carboxymethyl cellulose; talc, clay, polyvinyl alcohol, gelatine and the like. Preferred for this purpose is hydroxypropyl methyl cellulose which should, preferably, have a viscosity of at least about 3,000 and, preferably, about 15,000 cps. as determined, at 20°C., with a 2%, by weight, aqueous solution of the polymer in a Ubbelohde viscometer according to ASTM Procedures D-1347-64 and D-2363-65T. This same procedure is used in determining the viscosity of the various grades of this suspending agent whose use is subsequently described in this disclosure.

Thus, the use of the latter suspending agent has been found to provide for an extremely clean reaction system. More particularly, the use, as a suspending agent, of hydroxypropyl methyl cellulose having the above-specified molecular weight requirements is found to virtually eliminate the phenomenon of plate out in the suspension polymerization step of the process of this invention whereas the use of other suspending agents often leads to a significant degree of plate out. Thus, as is known to those skilled in the art "plate out" refers to the undesirable formation of a skin or film of polymer on the reactor wall. Needless to say, this skin presents a serious problem since it must be removed prior to any subsequent usage of the reactor inasmuch as it interferes with proper heat transfer during polymerization. Therefore, the discovery that the use of a certain molecular weight grade of hydroxypropyl methyl cellulose lead to the virtual elimination of plate out in this process represents a substantial improvement over the prior art process for preparing SEI particles such, for example, as described in German Patent 1,090,857, since the need for having to clean the reactor between runs, particularly in large commercial reactors, is an expensive and time consuming procedure.

In addition, the use of the above-described grade of hydroxypropyl methyl cellulose results in the attainment of a satisfactory bulk density and particle size distribution on the part of the resulting SEI particles. As will be explained in greater detail hereinbelow, the attainment of each of the latter two characteristics, i.e., satisfactory bulk density and particle size distribution, is a factor of vital significance in the process of the subject invention.

In addition, a monomer soluble catalyst or initiator such, for example, as azobisisobutyronitrile, lauroyl peroxide, benzoyl peroxide or isopropylperoxy dicarbonate should be present in a concentration of from about 0.02 to 1.0%, by weight, of the vinyl chloride monomer or monomer mixture that has been added to the rubber polymer emulsion. It has also been found that adjusting the pH of the rubber latex to a level within the range of from about 7–9 has the effect of improving its mechanical stability and also serves to produce a clean reaction during the subsequent suspension polymerization step. This pH adjustment may be readily accomplished by the addition, to the emulsion, of the requisite quantity of a basic solution such, for example, as an aqueous solution of sodium carbonate or bicarbonate or of sodium hydroxide.

Polymerization may then be initiated by heating the above-described recipe at a temperature in the range of from about 45° to 75°C. and for a period of from about 2 to 12 hours with agitation being applied throughout the course of the reaction. The resulting product is an aqueous suspension of SEI particles wherein the supernatant fluid is completely devoid of any of the original rubber polymer emulsion. The total SEI particle solids content of these suspensions will be in the range of from about 20 to 50%, by weight. Each of these SEI particles comprise, in effect, a particle of a rubber polymer prepared by means of an emulsion polymerization procedure having a vinyl chloride suspension polymer which has been polymerized onto the rubber polymer particle by means of a suspension polymerization step so that it surrounds and/or is homogeneously dispersed throughout the mass of the crosslinked acrylic rubber emulsion polymer particle. The extent to which this vinyl chloride suspension polymer will surround and/or be dispersed within the mass of the crosslinked acrylic rubber emulsion polymer particle will, of course, be determined by the particular monomers which are utilized in the suspension polymerization step as well as by the particular polymer which comprises the cross-linked acrylic rubber polymer fraction.

Thus, in these SEI particles, the crosslinked acrylic rubber emulsion polymer may be present in a concentration of from 2.0 to 80%, by weight; said rubber particles having the suspension polymer surrounding and/or homogeneously dispersed therein; the latter proportions being based on the total weight of the SEI interpolymer particles. Preferred products should contain from about 30 to 55%, by weight, of the crosslinked acrylic rubber emulsion polymer and about 55 to 70%, by weight, of the vinyl chloride suspension polymer surrounding and/or homogeneously dispersed throughout the mass of said rubber emulsion polymer. It is important, with respect to this disclosure, to distinguish between the processes of suspension and emulsion polymerization.

Thus, suspension polymerization refers to a method of polymerization whereby one or more monomers is dispersed in a suspension medium which is a non-solvent for both the monomer and the resulting polymer. Generally water is utilized for this purpose and a monomer soluble, i.e., an oil soluble, polymerization initiator is thereupon introduced. Polymerization takes place within the monomer phase containing the polymerization initiator. The use of the suspending medium assists in the dissipation of the heat of reaction and the polymerization reaction and consequently the molecular weight of the resulting polymer is therefore easier to control. Suspension polymerization is generally accomplished by dispersing the monomer in the suspending medium either by constant agitation or by the use of a suspending agent or both. Various suspending agents are known in the art such, for example, as gelatine, hydroxymethyl cellulose, hydroxyethyl cellulose, methyl cellulose, carboxymethyl cellulose, talc, clay, polyvinyl alcohol and the like.

By contrast, emulsion polymerization involves a process whereby one or more monomers are emulsified in the form of droplets within a continuous phase which should be inert with respect to both the emulsified monomers and the resulting polymer. Water is generally selected as the continuous phase. Emulsification of the monomers is facilitated by the use of one or more emulsification agents which tend to reduce the interfacial tension between the dispersed and continuous phases. Typical emulsifiers include common soaps, salts of long-chain carboxylic and sulfonic acids, alkylated aromatic sulfonic acids and salts of long-chain amines.

A water soluble initiator is employed and it is believed that the polymer chains originate in the continuous, aqueous phase and then continue their growth in the dispersed monomer-polymer phase yielding the polymer product in a finely divided state which remains emulsified within the continuous, aqueous medium. Thus, an important distinction between emulsion and suspension polymerization is that in the former, the monomer is either dispersed into droplets which are stabilized by an adsorbed layer of soap molecules or is solubilized in the soap micelle which is present in aqueous soap solutions. As a result, stable polymer emulsions are readily obtained whereas, in a suspension polymerization, the resulting polymer particles are of a relatively larger mass which tend to more readily separate out from the suspension.

A preferred procedure for carrying out the process of this invention involves the preparation of the cross-linked acrylic rubber latex in the same reactor in which the vinyl chloride polymer will subsequently be polymerized. This avoids the need for subsequently removing the rubber latex from the reactor in which it was originally prepared and then introducing it into a different reaction vessel.

The SEI particles resulting from the process of this invention should desirably have a particle size in the range of from about 10 to 200 microns and can, therefore, be readily recovered, as by filtration on a Buchner funnel or similar apparatus, and thereupon simply air dried. There is no need for the use of a costly and time consuming spray drying or coagulation procedure as is usually required for the isolation, on a large scale commercial basis, of the rubber polymer particles from which these SEI particles are themselves prepared. These SEI particles should also have a bulk density of at least about 0.2 and preferably about 0.3 to 0.4 gm/cm$^3$ as determined, for example, by ASTM D-1895. The possession, by the SEI particles, of the above-stated particle size and bulk density characteristics is highly advantageous with respect to their subsequent admixture with ordinary rigid thermoplastics; the preparation of such blends, as has been noted hereinabove, being one of the preferred embodiments of this invention.

Rigid plastics that can be reinforced by the introduction of the SEI particles of this invention include:

1. acrylonitrile-butadiene-styrene resins, commonly referred to as "ABS" resins, which generally comprise either a mixture of a 60 to 80:40 to 20 styrene:acrylonitrile copolymer with from about 10 to 40%, by weight, of a 5 to 40:95 to 60 acrylonitrile-butadiene copolymer or a mixture of a 60 to 80:40 to 20 styrene:acrylonitrile copolymer with from about 10 to 40%, by weight, of a graft of the latter copolymer onto polybutadiene.

2. copolymers of styrene, alphamethyl styrene and/or tertiary butyl styrene, acrylonitrile and methacrylonitrile, commonly known as "SAN" polymers;

3. the acrylate:styrene:acrylonitrile resins, commonly referred to as "ASA" resins, which comprise copolymers containing a major proportion of a $C_2-C_8$ alkyl acrylate ester elastomer upon which is grafted about 65 to 95%, by weight, of the latter copolymer, of a 70–80:30–20 styrene:acrylonitrile copolymer.

4. the methacrylate:butadiene:styrene resins, commonly referred to as the "MBS" resins, which comprise a minor proportion of a methyl methacrylate:styrene:acrylonitrile terpolymer grafted and/or blended with either polybutadiene or a copolymer of butadiene and minor proportions of such comonomers as, for example, styrene and acrylonitrile.

The SEI particles may be dispersed in the rigid plastics by means of any convenient procedure which will result in an intimate admixture of the SEI particles within the mass of the substrate polymer. This may be accomplished by mill blending, co-extruding or by blending the SEI particles with the substrate while both are in the form of solid powders, aqueous dispersions or slurries. With respect to proportions, the resulting blends should contain a sufficient concentration of the SEI particles so that from about 0.5 to 30%, by weight, of rubbery polymer derived from the SEI particles is present therein.

The following examples will further illustrate the embodiment of this invention. In these examples, all parts given are by weight unless otherwise noted. In addition, it is to be pointed out that the glass transition temperature of all of the rubber polymers described in these examples is less than 25°C.

EXAMPLE I

This example illustrates the preparation of SEI particles by means of the process of this invention and their subsequent use as an impact modifier for various rigid plastics.

Part 1 — Preparation of a 98:2 n-Butyl Acrylate:1,3-Butylene Diacrylate Copolymer Latex The following ingredients are placed in a 1 quart bottle which is capped, heated to 70°C. and rotated for 2 ½ hours:
264 gms $H_2O$
50 ml of a 1%, by weight, aqueous solution of the bis(tridecyl) ester of sodium sulfosuccinic acid having an HLB value of ~ 4 to 7
33 ml of a 2%, by weight, aqueous solution of potassium persulfate
3.3 gms 1,3-butylene diacrylate
162 gms n-butyl acrylate By means of this procedure, an emulsion having 30%, by weight, of resin solids is obtained wherein the copolymer particles have a particle size of about 0.29 microns.

Part 2 — Preparation of a 70/30 PVC/n-Butyl Acrylate:1,3-Butylene Diacrylate Interpolymer The following ingredients are placed into a 1 quart bottle which is capped, heated and rotated at 38 RPM for 8 hours at 60°C.:
70 gms vinyl chloride
100 gms of the latex whose preparation is described in Part 1
200 gms $H_2O$
0.075 gms azobisisobutyronitrile
40 ml of a 1%, by weight, of an aqueous solution of polyvinyl alcohol A granular white powder is obtained which is air dried. These SEI particles have an average particle size of 100 microns and a bulk density of at least 0.2 gm/cm³.

Part 3 — Use of the 70/30 Interpolymer as an Impact Modifier for a Styrene-Acrylonitrile Copolymer A blend of a styrene-acrylonitrile polymer with the above-described interpolymer is prepared by milling, for 5 minutes at a temperature of from 310°–330°F., a formulation consisting of 50 parts of the 70/30 PVC/butyl acrylate:butylene diacrylate SEI particles whose preparation is described hereinabove, 50 parts of a 75:25 styrene:acrylonitrile copolymer, 0.3 parts of stearic acid and 0.75 parts of an acrylic polymer processing aid sold as "Acryloid K-120N" by the Rohm & Haas Co. The resulting blend is white in color and displays excellent resistance to shock. This blend has a limiting oxygen Index (L.O.I.) of 21–22 whereas conventional ABS has an L.O.I. of 18.5. The LOI is a means of evaluating the fire retardancy of a material. It is determined by means of the procedure described in Fenimore and Martin in the November, 1966 issue of Modern Plastics. In brief, this procedure directly relates flame retardancy to a measurement of the minimum percentage concentration of oxygen in an oxygen:nitrogen mixture which permits the sample to burn; the LOI being calculated as follows:

$$LOI = \frac{[O_2]}{[O_2] + [N_2]} \times 100$$

Thus, a higher LOI is indicative of a higher degree of flame retardancy.

Part 4 — Use of the 70/30 Interpolymer as an Impact Modifier for a Tertiary Butyl Styrene-Acrylonitrile Copolymer Using the milling procedure described in Part 4, hereinabove, there is prepared a blend of 50 parts of the above-described 70/30 PVC/butyl acrylate:butylene diacrylate SEI particles and 50 parts of a 75:25 tertiary butyl styrene: acrylonitrile copolymer. The resulting blend displays excellent physical properties including a heat distortion temperature substantially higher than that of conventional PVC and good flame retardance characteristics as evidenced by the fact that it is self-extinguishing when evaluated by means of ASTM test D-635. Comparable results with respect to the physical properties of the resulting products are obtainable upon blending the SEI particles with various other rigid, thermoplastic polymers including polymethyl methacrylate and polymethacrylonitrile.

EXAMPLE II

This example illustrates the preparation of another of the novel interpolymers of this invention.

Part 1 — Preparation of a 98:2 n-Butyl Acrylate:1,3-Butylene Dimethacrylate Copolymer Latex The following ingredients are placed in a 1 quart bottle which is capped, heated to 70°C. and rotated for 2 ½ hours:

220 gms $H_2O$
170 ml of a 1%, by weight, aqueous solution of sodium 2-ethylhexylsulfate (HLB value = ~ 40)
52 ml of a 2%, by weight, aqueous solution of potassium persulfate
3.5 gms of 1,3-butylene dimethacrylate
172 gms n-butyl acrylate By means of this procedure, an emulsion having 29%, by weight, of resin solids is obtained wherein the copolymer particles have a particle size of about 0.30 microns.

Part 2 — Preparation of a 75/25 PVC/n-Butyl Acrylate:1,3-Butylene Dimethacrylate Interpolymer The following ingredients are placed into a 1 quart bottle which is capped, preheated and rotated at 38 RPM for 7 ½ hours at 60°C.:

100 gms vinyl chloride
120 gms of the latex whose preparation is described in Part 1 of this example
160 gms $H_2O$
0.075 gms azobisisobutyronitrile
60 ml of a 1%, by weight, aqueous solution of hydroxypropyl methyl cellulose having a viscosity of 15,000 cps.

A granular white powder is obtained which is air dried. These SEI particles have an average particle size of 100 microns and a bulk density of at least 0.2 gm/cm³. The properties of this product are comparable to those of the product of Example I.

EXAMPLE III

This example illustrates the improved results obtained when hydroxypropyl methyl cellulose having a viscosity of about 15,000 cps. is used as the suspending agent during the suspension polymerization step of the process of this invention.

Part 1 — Preparation of Rubber Latex

A crosslinked 98:2 n-butyl acrylate:1,3-butylene dimethyacrylate copolymer latex is prepared by combining 100 pounds of water, 50 grams of potassium persulfate and 48.5 grams of the bis(tridecyl) ester of sodium sulfosuccinic acid in a 20 gallon reactor. Forty four pounds of n-butyl acrylate are then combined with 404 grams of 1,3-butylene dimethacrylate and the resulting mixture is divided into three equal portions. The first of these portions is charged into the reactor which is then heated to 70°C. with gentle agitation and maintained at this level until an exothermic reaction starts. As soon as the exotherm subsides, the second portion of the monomer mixture is charged into the reactor which is heated to 70°C. in order to permit the reactants to attain an exotherm. Finally, the remaining portion of monomer is charged and allowed to react. After a total reaction period of about 1 ½ hours, the final exotherm subsides, the reaction mixture is allowed to cool to room temperature. The resulting latex contains 30%, by weight, of resin solids.

Part 2 — Evaluation of Suspending Agent

A total of about 200 grams of the selected suspending agent, as set forth in the following table, is dissolved in about 20 pounds of water whereupon an additional 23.125 pounds of water is added and the entire solution is charged into a 10 gallon reactor along with 18 pounds of the latex whose preparation is described in Part 1, hereinabove, and 6.7 grams of azobisisobutyronitrile. The charged reactor is evacuated twice in order to displace the oxygen therefrom whereupon 16.94 pounds of vinyl chloride is introduced. The charged reactor is vigorously agitated, heated to 60°C. and held at this level until the pressure gauge shows a 38 psia pressure decrease. Unreacted vinyl chloride is then vented and the contents of the reactor allowed to cool to room temperature. The resulting granular polymer is then filtered, washed and dried. In each case, the resulting product is 70/30 PVC n-butyl acrylate: 1,3-butylene dimethacrylate copolymer.

To obtain the particle size distribution, 100 grams of the dried polymer are placed on the top screen of a set of U.S. Standard Mesh sieves and shaken for 30 minutes whereupon the weight retained on each screen is then determined. In addition, after each run, the reactor is opened and its wall examined for plate out, i.e., for polymer coating. The following table provides the results of this study.

| Suspending Agent Used - | Hydroxypropyl Methyl Cellulose (Viscosity-35 cps.) | Polyvinyl Alcohol | Hydroxypropyl Methyl Cellulose (Viscosity= 15,000 cps.) |
| --- | --- | --- | --- |
| Suspending Agent, Wt. | 20 gms | 19.2 gms | 20 gms |
| Sieve Analysis: | | % Particles Retained | |
| On 40 mesh | 2.0 | 0.4 | 0.4 |
| On 60 mesh | 17.1 | 6.0 | 0.4 |
| On 80 mesh | 36.9 | 32.5 | 1.3 |
| On 100 mesh | 25.9 | 38.7 | 5.9 |
| On 140 mesh | 13.5 | 19.9 | 68.0 |
| On 200 mesh | 2.5 | 1.5 | 21.0 |
| On pan | 2.1 | 1.0 | 3.0 |
| Reactor Appearance | Extensive Plate Out | Very Slight Plate Out | Virtually No Plate Out |

EXAMPLE IV

This example illustrates the use of the novel interpolymers of this invention in the preparation of blends with various thermoplastic polymer substrates and also demonstrates the superior impact values of these blends as compared with the results obtained with unmodified samples of the identical thermoplastic polymers.

The formulations described in the following table are prepared using a two-roll mill, operating at 350°–360°F., for a period of about three minutes.

|  | Formulation No. | | | | |
| --- | --- | --- | --- | --- | --- |
|  | 1 | 2 | 3 | 4 | 5 |
| The 70/30 interpolymer whose preparation is described in Example I | 50 | 50 | 50 | 50 | 50 |
| An ASA resin sold as "Luran 776" by the Badische Anilin & Soda Fabrik A.G. | 50 | | | | |
| An MBS resin sold as "XT 500" by the American Cyanamid Co. | | 50 | | | |
| An ABS resin sold as "Cycolac H.E." by the Marbon Chemical Division of the Borg-Warner Corp. | | | 50 | | |
| An ABS resin sold as "Blendex 301" by the Marbon Chemical Division of the Borg-Warner Corp. | | | | 50 | |
| An MBS resin sold as "Acryloid KM 611" by the Rohm & Haas Co. | | | | | 50 |
| "Thermolite 31" | 1.5 | 1.5 | 1.5 | 1.5 | 1.5 |
| A monostearate lubricant sold as "Aldol MS" by Glyco Chemicals, Inc. | 1.0 | 1.0 | 1.0 | 1.0 | 1.0 |
| Tris(nonylphenyl)phosphite | 1.0 | 1.0 | 1.0 | 1.0 | 1.0 |

The impact resistance of each of the above-described blends is then determined with respect to their tensile impact strength and Izod impact strength values. These same properties are also evaluated for a series of control formulations containing samples of each of the above-listed thermoplastic polymers which do not, in this case, contain the novel interpolymer modifier of this invention but which do, on the other hand, contain all of the other ingredients which are present in the above-described formulation. The results of these evaluations are presented in the following table:

| Formulation No. | Thermoplastic Polymer | Izod Impact [1] Strength (ft lbs/sq in) | | Tensile Impact [2] Strength (ft lbs/sq in) | |
| --- | --- | --- | --- | --- | --- |
| | | 50/50 Blend with Interpolymer | Control (Unmodified Sample) | 50/50 Blend W/Interpolymer | Control (Unmodified Sample) |
| 1 | "Luran 776" | 12.9 | 5.0 | 250 | 123 |
| 2 | "XT 500" | 14.9 | 2.9 | 193 | 48 |
| 3 | "CYCOLAC HE" | 10.7 | 6.3 | 205 | 54 |
| 4 | "BLENDEX 301" | 11.2 | 3.8 | 204 | 158 |
| 5 | "Acryloid KM 611" | 11.6 | 8.3 | 323 | 204 |

[1] ASTM Procedure D-256
[2] ASTM Procedure D-1822-61T using a Type L specimen

The above-given data clearly demonstrate the unusual increase that is achieved in the impact strength of a variety of thermoplastic polymers upon their being blended with the novel interpolymer impact modifiers of this invention.

EXAMPLE V

This example illustrates the preparation of another interpolymer of this invention by means of a procedure in which both the emulsion and suspension polymerization procedures are carried out in the same reaction vessel.

Part 1 – Preparation of a 98.2 Butyl Acrylate:1,3-Butylene Dimethacrylate Copolymer Latex The following ingredients are placed into a 30 gallon reactor and are then heated to 75°C. for 1 ½ hours:
  121.3 lbs. deionized water
  19.0 gms of a 1%, by weight, aqueous solution of the bis(tridecyl) ester of sodium sulfosuccinic acid (HLB value = ~ 4 to 7)
  13.3 gms sodium bicarbonate
  17.0 gms potassium persulfate
  142.9 gms 1,3-butylene dimethacrylate
  15.0 lbs. n-butyl acrylate By means of this procedure, an emulsion having 11%, by weight, of resin solids is obtained wherein the copolymer particles have a particle size of about 0.3 microns.

Part 2 — Preparation of a 23/77 PVC/n-Butyl Acrylate:1,3-Butylene Dimethacrylate Interpolymer While still in the same reaction vessel used for its preparation as described in Part 1 hereinabove, the latex is cooled to 40°C. and the following ingredients added thereto:
  25.0 gms of hydroxypropyl methyl cellulose (Visc. = 15,000 cps.) dissolved in 5 lbs. of deionized water
  4.1 gms azobisisobutyronitrile
  7.05 lbs. vinyl chloride
  60.0 lbs. deionized water The resulting mixture is heated to 60°C. until a pressure drop of about 80 psi occurs. A rubbery white powder is thereby obtained which is then air dried. These SEI particles have an average particle size of 100 microns and a bulk density of at least 0.15 gm/cm$^3$. Upon being blended with samples of a PVC and ABS resin in a concentration such that each of the resulting blends contain about 20% of acrylic rubber derived from these SEI particles, it is found that there is a substantial improvement in the impact resistance of these blends.

EXAMPLE VI

This example shows the preparation of SEI particles based upon a crosslinked copolymer of n-butyl acrylate and 2-ethylhexyl acrylate.

Part 1 — Preparation of a 68:30:2 Butyl Acrylate:2-Ethylexyl Acrylate:1,3-Butylene Diacrylate Copolymer Latex The following ingredients were placed into a 30 gallon reactor which was purged with nitrogen gas, sealed, and heated to 65°C. for 3 hours:

122 lbs. deionized water
19.0 gms of a 1%, by weight, aqueous solution of the bis(tridecyl) ester of sodium sulfonsuccinic acid
13.3 gms sodium bicarbonate
17.0gms potassium persulfate
143 gms 1,3-butylene diacrylate
4.5 lbs. 2-ethylhexyl acrylate
10.5 lbs. n-butyl acrylate By means of this procedure, an emulsion having 11%, by weight, of resin solids was obtained, wherein the copolymer latex particles have a diameter of about 0.24 microns.

Part 2 — Preparation of a 50/50 PVC/n-Butyl Acrylate:2-Ethylhexyl Acrylate:1,3-Butylene Diacrylate Interpolymer The following reactants were placed in a 1 quart bottle which was sealed and heated at 60°C. with rotation for 9 hours:

600 gms of emulsion as prepared in Part 1 of this example
70 gms vinyl chloride monomer
80 gms of a 1% solution of 15,000 cps Methocel 90 HG (hydroxypropyl methyl cellulose)
0.1 gm azobisisobutynitrile The resulting slurry was filtered and dried at 50°C. to a constant weight. A solid white powder having a particle diameter of about 200–250 microns was obtained.

EXAMPLE VII

This example shows the preparation of ABS, ASA and MBS polymers having SEI particles prepared in Example VI incorporated therein.

Thirty grams of the SEI as prepared in Example VI was added to 70 grams each of ABS, ASA and MBS polymers as described in Example IV. The finished products contained 15%, by weight, of the crosslinked alkyl acrylate rubber distributed in the rigid thermoplastic. Test results of Izod impact strength and tensile impact strength showed, as in Example IV, that the impact strength of the parent thermoplastics were substantially increased by the incorporation of 15% of crosslinked acrylate rubber.

Variations may be made in proportions, procedures and materials without departing from the scope of this invention as defined in the following claims.

What is claimed is:

1. An impact resistant composition comprising an intimate admixture of a styrene-containing rigid plastic having a modulus of elasticity of greater than 7,000 kgf/cm$^2$ at 23°C. and 50% relative humidity and rubber-containing interpolymer particles consisting essentially of a crosslinked polymer of $C_2$–$C_8$ alkyl acrylate emulsion polymers having a glass transition temperature less than about 25°C. and a vinyl chloride suspension polymer surrounding and/or homogeneously dispersed within the mass of said crosslinked acrylate emulsion polymer.

2. The composition of claim 1, wherein said crosslinked acrylic rubber emulsion polymer of said particles comprises from about 2.0 to about 80%, by weight, thereof.

3. The composition of claim 1, wherein the acrylic rubber emulsion polymer of said particles is a crosslinked copolymer derived from at least one monomer selected from the group consisting of the $C_2$–$C_8$ alkyl acrylates and mixtures thereof with each other and with a minor proportion of at least one other vinyl monomer.

4. The composition of claim 3, wherein said acrylic rubber emulsion polymer is a crosslinked copolymer of a $C_2$–$C_8$ alkyl acrylate and a polyfunctional ethylenically unsaturated monomer.

5. The composition of claim 4, wherein said acrylic emulsion polymer of said particles is a crosslinked copolymer of n-butyl acrylate and a polyfunctional ethylenically unsaturated monomer.

6. The composition of claim 5, wherein said polyfunctional ethylenically unsaturated monomer is selected from the group consisting of 1,3-butylene dimethacrylate, ethylene glycol dimethacrylate, 1,3-butylene diacrylate, triethylene glycol dimethacrylate and trimethylolpropane trimethacrylate.

7. The composition of claim 1, wherein said vinyl chloride suspension polymer is selected from the group consisting of polyvinyl chloride and copolymers of vinyl chloride with a minor proportion of at least one other vinyl monomer.

8. The composition of claim 7, wherein said vinyl chloride suspension polymer is polyvinyl chloride.

9. The composition of claim 1, wherein said rigid plastic is an ABS polymer.

10. The composition of claim 1, wherein said particles are present in a concentration such that said composition has a total acrylic rubber content derived from said particles of from about 0.05 to 30%, as based on the total weight of said composition.

11. The composition of claim 1, wherein the emulsion polymer is a crosslinked n-butyl acrylate.

12. The composition of claim 1, wherein the emulsion polymer is a crosslinked copolymer of 50–70% n-butyl acrylate and 50–30% of 2-ethylhexyl acrylate.

13. The composition of claim 11, wherein the emulsion polymer is crosslinked with a minor amount of 1,3-butylene diacrylate.

14. The composition of claim 12, wherein the emulsion polymer is crosslinked with a minor amount of 1,3-butylene diacrylate.

* * * * *